United States Patent
Bernard et al.

(10) Patent No.: US 12,185,064 B2
(45) Date of Patent: Dec. 31, 2024

(54) ELECTRICALLY OR PARTIALLY ELECTRICALLY POWERED VEHICLE WITH AN ACTIVE SOUND DESIGN SYSTEM

(71) Applicant: Dr. Ing. h.c. F. Porsche Aktiengesellschaft, Stuttgart (DE)

(72) Inventors: Benjamin Bernard, Karlsruhe (DE); Bjoern Seinecke, Bietigheim-Bissingen (DE)

(73) Assignee: Dr. Ing. h. c. F. Porsche AG, Stuttgart (DE)

(*) Notice: Subject to any disclaimer, the term of this patent is extended or adjusted under 35 U.S.C. 154(b) by 252 days.

(21) Appl. No.: 17/871,069

(22) Filed: Jul. 22, 2022

(65) Prior Publication Data
US 2023/0036934 A1 Feb. 2, 2023

(30) Foreign Application Priority Data
Jul. 23, 2021 (DE) ...................... 10 2021 119 125.4

(51) Int. Cl.
H04R 3/00 (2006.01)
(52) U.S. Cl.
CPC ........... *H04R 3/00* (2013.01); *H04R 2499/13* (2013.01)
(58) Field of Classification Search
CPC .... H04R 3/00; H04R 2499/13; G07C 5/0833; G08G 1/0112; G08G 1/0129; B60Q 9/00; G10K 15/02
See application file for complete search history.

(56) References Cited

U.S. PATENT DOCUMENTS

| 8,712,615 B2 * | 4/2014 | Omote | G10K 15/02 |
| | | | 701/22 |
| 10,755,691 B1 | 8/2020 | Herman et al. | |
| 2020/0324697 A1* | 10/2020 | Lee | B60W 40/08 |

FOREIGN PATENT DOCUMENTS

| CN | 110481470 B * | 1/2021 |
| DE | 102019111913 A1 | 11/2020 |

(Continued)

OTHER PUBLICATIONS

"Make your Tesla Model 3 sound like a supercar with this incredible tech" by Sean Szymkowski, published by CNET (article updated Mar. 11, 2020) (Year: 2020).*

(Continued)

*Primary Examiner* — Peter D Nolan
*Assistant Examiner* — Tanya C Sienko
(74) *Attorney, Agent, or Firm* — Gerald E. Hespos; Michael J Porco

(57) ABSTRACT

An electrically or partially electrically driven vehicle has a system (1) for active sound design. Active sound design sounds emitted by one or more loudspeakers (5) are modified depending on the driver type and/or depending on the current driving style. The system (1) has at least one sensor for recording measurement parameters (2) that permit a classification of a current driving style and/or a driver type of a driver of the vehicle. The device (1) has a classification device (3) that is configured to determine the current driving style and/or driver type of the driver of the vehicle based on the measurement parameters (2) recorded by the at least one sensor. The system (1) has a sound control system for controlling and modifying the sounds emitted by the loudspeakers (5) based on the current driving style and/or driver type classified by the classification device (3).

10 Claims, 1 Drawing Sheet

(56) References Cited

FOREIGN PATENT DOCUMENTS

EP          2913792          9/2015
EP          2913792  A1 *   9/2015   ............. G06Q 30/02

OTHER PUBLICATIONS

Machine translation of EP2913792-A1 (interspersed with original) downloaded off Espacenet May 24, 2024 (Year: 2024).*
Machine translation of CN-110481470B off IP.com May 20, 2024 (Year: 2024).*

* cited by examiner

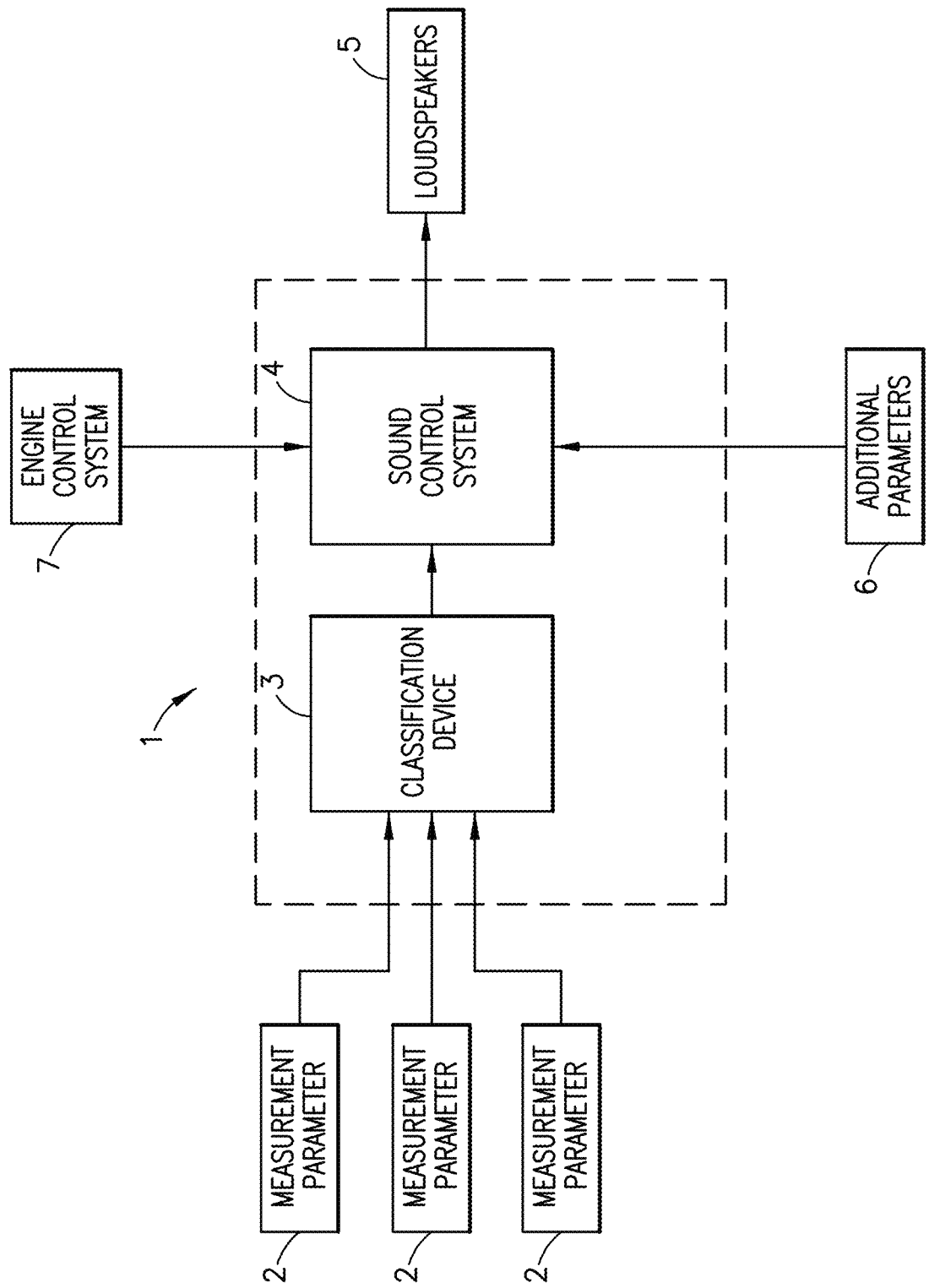

ELECTRICALLY OR PARTIALLY ELECTRICALLY POWERED VEHICLE WITH AN ACTIVE SOUND DESIGN SYSTEM

CROSS REFERENCE TO RELATED APPLICATION

This application claims priority on German Patent Application No 10 2021 119 125.4 filed Jul. 23, 2021, the entire disclosure of which is incorporated herein by reference.

BACKGROUND

Field of the Invention The invention relates to an electrically or partially electrically powered vehicle with an active sound design system.

Related Art The prior art describes vehicles with an active sound design system that generates artificial engine noise based on the speed and torque of an electric motor, the driving speed, the driving situation and other parameters such as the driving mode. For example, DE 10 2019 111 913 A1 discloses a method and system for generating artificial engine noise in a motor vehicle. In addition, US 2020/0193960 A1 discloses a system and a method for active sound design in a vehicle where a sound output device amplifies engine noise in the interior to the driver of the vehicle with an engine noise that is not perceived by the driver as artificial.

US 2020/0324697 A1 and 10,755,691 B1 disclose further prior art.

Vehicles with active sound control often feature an Active Sound Design (ASD) system. The disadvantage of the systems on the market is that such systems are not able to take into account the type of driver of the motor vehicle and/or the current driving style of the driver of the vehicle in the active sound design. This can lead to an unsatisfactory sound experience for the driver of the vehicle. A driver of the vehicle who corresponds to the "sporty" driver type, or whose current driving style is characterized as "sporty", expects a corresponding engine noise that meets the expectations of a sports car. A loud, roaring and full-throated sound usually is expected in a sports car. On the other hand, a driver of a motor vehicle who drives with a leisurely style and/or optimized for fuel economy, would also prefer to be presented with unobtrusive or quiet sounds. A uniform sound design therefore leads to unsatisfactory experiences for some vehicle drivers, and there is room for improvement in the sound experienced by the driver.

The object of the invention is to create an electrically or partially electrically powered vehicle having an active sound design system, where this system takes into account the driver type and/or the current driving style of the driver of the vehicle in the active sound design so that the active sound design system automatically adjusts the sounds according to the driver type and/or the current driving style.

SUMMARY

This disclosure relates to an electrically or partially electrically driven vehicle that has an active sound design system to emit sounds from one or more loudspeakers, preferably loudspeakers in the interior of the vehicle. The sounds are modified depending on the driver type and/or depending on the current driving style. The modifications can affect, for example, the volume, the tonality or timbre, the tonal color and/or sounds emitted in addition to the sounds emitted by the loudspeakers, in particular simulated engine sounds and/or simulated noises of an exhaust system. For example, the typical sounds of a valve-equipped muffler system may or may not be output, depending on the driver type and/or driving style.

For this purpose, the system has at least one sensor, and preferably plural sensors, for recording measurement parameters. The measurement parameters allow a classification of a current driving style and/or driver type of a driver of the vehicle. A wide variety of measurement parameters can be used. For example, the sensors could be acceleration sensors that detect, for example, a longitudinal acceleration of the vehicle and/or a transverse acceleration of the vehicle. For example, particularly high acceleration values and particularly high acceleration values at short intervals may lead to a conclusion that the driver of the motor vehicle maintains a rather sporty driving style, or is currently maintaining a sporty driving style. The sensors can also be acceleration sensors that relate to the acceleration of an accelerator pedal and/or the acceleration of a steering wheel. In this case also, particularly high acceleration values, and high acceleration values at short intervals, can indicate that the driver of the vehicle is driving in a sporty manner. The system also may have a classification device that is configured to determine the current driving style and/or driver type of the driver of the vehicle on the basis of the measurement parameters recorded by the at least one sensor. The system also has a sound control system for controlling and modifying the sounds emitted by the one or more loudspeakers based on the current driving style and/or driver type classified by the classification device.

The system described herein has the advantage that the sounds emitted by the loudspeakers meet the expectations of the driver of the vehicle without the driver having to actively select the desired sound environment (sporty, discreet, particularly steady). More particularly, the appropriate sound environment is adjusted or changed automatically by the system according to the current driving style and/or driver type of the driver of the vehicle. This means that the sound environment automatically adapts to the driving style of the driver of the vehicle.

The current driving style of the driver of the motor vehicle can differ entirely from the driver type of the driver of the vehicle. For example, it is conceivable for the driver of the vehicle to correspond to a driver type that in principle drives for optimum fuel economy, namely accelerating at a more leisurely pace and not performing particularly fast load changes. However, it is also entirely possible that the current driving style of this driver type is nevertheless sporty, so that the current driving style, namely a sporty driving style, is taken into account in the active sound design so that this driver type is also presented with the corresponding sporty sound environment, even in a temporary sporty driving style. In a manner of speaking, a temporarily sporty driving style is rewarded with a sporty sound environment. This does not require any active change of the desired sound environment by the driver of the vehicle, but their current driving style gives rise directly to a change in the sound environment.

For example, the classification device can use the positive accelerations of the vehicle as a criterion for the classification of the driver type or driving style. A "sporty" driver type or driving style can be distinguished from a "steady" or "optimized fuel economy" driver type or driving style, for example, by the fact that in a "sporty" driving style higher accelerations are required from the drive unit than in a "steady" or "fuel-optimized" driving style. In the classification of the driving style or the driver type, braking operations, or negative accelerations, can also be taken into account as a criterion. Short, sharp braking operations with high negative braking accelerations are more indicative of a "sporty" driver.

In particular, the sounds emitted are an engine noise, in particular an engine noise of an internal combustion engine.

The sensor or sensors of some embodiments record measurement parameters that relate to one or more components of the vehicle that are handled directly by the driver of the vehicle when driving the vehicle. These components can be a steering wheel, an accelerator pedal, a brake pedal, a clutch pedal and/or a gear change device.

The sensor or sensors of some embodiments record biometric data and/or vital signs of the driver of the vehicle, in particular a heart rate and/or a body temperature and/or an eyelid blink frequency. The sensors that record biometric data and/or vital signs of the driver of the vehicle need not be part of the vehicle. Rather, the vehicle, in particular the classification device, may access data from sensors that record the corresponding measurement parameters. These sensors can be parts of wearables, such as parts of components that the vehicle driver wears on the body, such as a heart rate watch.

The classification device may assign the current driving style and/or driver type to one of plural defined classes. To control and modify the sounds emitted by the one or more loudspeakers, the sound control system selects an appropriate operating mode based on the classification. Accordingly, in a sporty driving style or in a currently sporty driving style, the corresponding operating mode also is selected by the sound control system, for example the operating mode "Sport", in which a more roaring engine noise is output than in the case of the "Normal" operating mode in a normal driving style or a currently normal driving style.

The classification device of some embodiments is configured to determine the current driving style and driver type of the driver of the vehicle on the basis of the measurement parameters recorded by the at least one sensor over a specified time interval. A time interval for determining the driver type is greater than a time interval for determining the current driving style. This embodiment has the advantage that even temporary driving styles, which do not correspond to the general driver type, give rise to a change in the sound environment. As a result, in the case of a sporty driver type who is driving temporarily in a leisurely style, for example in heavy traffic or on a freeway where the speed is limited, the current driving style is classified as less sporty and the sounds are modified accordingly. On the other hand, in the case of a rapid acceleration to a high speed following this temporary leisurely driving style, for example when the speed limit is removed or the heavy traffic has cleared, sounds with an appropriately sporty tone are emitted when the vehicle accelerates.

The system of some embodiments is configured to modify the sounds emitted by the one or more loudspeakers depending on the current driving style. Thus, the classification device may be configured to determine the current driving style of the driver of the vehicle using the measurement parameters recorded by the at least one sensor over a specified time interval. The time interval may be from 1 second to 60 seconds, the time interval being in particular from 10 seconds to 40 seconds, the time interval being particularly preferably 15 seconds to 25 seconds.

The system may be configured so that a current driving style that differs from the driver type must be maintained for a longer time to cause a change in the sounds emitted than in the case of a current driving style that corresponds to the driver type. Thus, in the case of a sporty driver type, the sound environment is not changed when a temporary leisurely driving style is used, but only if this leisurely driving style is maintained for a longer period of time. In the case of a sporty driver type in which a leisurely driving style maintained for a longer time has led to a change in the sounds emitted, a switch to a sporty driving style will lead to a change in the sound environment within a short time. A driving style that currently differs from the driver type must therefore be maintained for a longer time to cause a change in the sounds. On the other hand, a current driving style that corresponds to the driver type will lead to a change in the sounds in a shorter time.

The vehicle of some embodiments has an operating device that allows the driver of the motor vehicle to select an operating mode of the active sound design system. Thus, the driver can operate the system in an operating mode in which the current driving style and/or driver type is not taken into account in the active sound design, but is set by the driver of the vehicle. For example, a "Sport" operating mode could be selected by the vehicle driver so that, regardless of the driver type and/or the current driving style, the device always emits sounds expected from a sports car with an internal combustion engine. On the other hand, an "Automatic" operating mode also can provide an active sound design. A "steady" operating mode is also conceivable.

The sensor or sensors may detect at least one of the following measurement parameters: a rotation speed of a steering wheel, an angular acceleration of a steering wheel, an angular velocity of an accelerator pedal, an angular acceleration of an accelerator pedal, a lateral acceleration of the vehicle, a longitudinal acceleration of the vehicle, a speed of the electric motor, a state of the traction control (launch control), a state of the electrical stability control or a driving dynamics control, and/or an operating mode of the chassis.

With regard to the most highly automated and satisfactory sound design for the driver of the vehicle, the system may be configured to modify the sounds emitted by the one or more loudspeakers depending on the current driving style when the measurement parameters recorded by the sensor or sensors exceed a specific value, in particular a specific value over a specified period of time. This prevents the type of the active sound design from constantly changing without the driver of the vehicle wishing it to do so. For example, it is entirely conceivable for the driver of the motor vehicle, for example when starting off at a traffic light, to accelerate particularly quickly, for example to be able to turn off in front of an oncoming vehicle, but the driver of the vehicle does not want a sporty, for example particularly roaring, sound design to be implemented, since the driver of the motor vehicle will then drive in a leisurely, comfortable or fuel-optimized style again and a sporty sound design would not correspond to this driving style. Thus, for example, a one-off, brief acceleration from a standstill, for example in the above scenario, is not sufficient to change the classification of the current driving style or driver type and is therefore not sufficient to change the sound design.

The sound control system of some embodiments is configured to take into account other parameters independent of the current driving style and/or the driver type in addition to the classification of the current driving style and/or the driver type. For example, the other parameters may relate to one or more of: a current traffic situation, e.g. via distance sensors or traffic messages; a future traffic situation, for example via traffic messages; a charge state of a traction battery of the vehicle; a destination; an operating mode of the vehicle, such as an operating mode of the power train; a reason for the journey; vital signs of the driver of the vehicle; and/or output signals of an engine control system.

The vehicle may have an AI (artificial intelligence) unit, and the classification of the current driving style and/or the driver type on the basis of the measurement parameters and/or the adaptation of the sounds emitted by the one or more loudspeakers may be carried out by means of the AI unit.

A noise background level inside and/or outside the vehicle may be taken into account as additional parameters.

The active sound design of some embodiments takes into account a distance to the destination and/or a distance to the nearest charging station, for example, to adapt the active sound design in such a way that the driver adopts a fuel-optimized driving style.

The following categories are possible as the driving style or driver type: "sporty", "race track", "fuel economy", "eco", "comfort", "steady" and "leisurely".

The vehicle may have a data processing unit that communicates with the sensor or sensors on the vehicle and/or worn by the driver, the classification device, the sound control system, the one or more loud speakers, the classification device, the operating device, distance sensors, traffic message devices, the AI unit and other components on or associated with the vehicle.

The data processing unit preferably has a processor that processes data related to the active sound design system. The processor or a further processor also is designed to control the active sound design system. The data processing unit and the processor may be integrated in the vehicle and/or in active sound design system or may be in the form of a cloud-based solution with a cloud computing infrastructure that is connected to the vehicle by a mobile radio connection. However, it is also possible for the data relating to active sound design system image to be stored in a storage unit and then to be processed by the data processing unit.

In the context of the invention, a "processor" can, for example, be a machine or an electronic circuit or a powerful computer. A processor can be a central processing unit (CPU), a microprocessor or a microcontroller, for example an application-specific integrated circuit or a digital signal processor, possibly in combination with a storage unit for storing program commands, etc. A processor also can be a virtualized processor, a virtual machine or a soft CPU and may be a programmable processor that is equipped with configuration steps for carrying out the method according to the invention or is configured with configuration steps so that the programmable processor realizes features according to the method, the component, the modules, or of other aspects and/or partial aspects of the invention. Furthermore, the system may have highly parallel computing units and powerful graphics modules.

In the context of the invention, a "storage unit" or "storage module" and the like can be understood to mean, for example, a volatile memory in the form of a main memory (random access memory, RAM) or a permanent memory such as a hard disk or a data carrier or e.g. an exchangeable storage module. However, the storage module can also be a cloud-based storage solution.

In the context of the invention, a "module" can be understood to mean, for example, a processor and/or a storage unit for storing program commands. By way of example, the module is configured specifically to execute the program commands in such a way that the module executes steps to implement or realize the method of the invention or a step of the method of the invention.

In the following FIGURE, the invention is elucidated in more detail using an exemplary embodiment, without being limited thereto.

BRIEF DESCRIPTION OF THE DRAWING

FIG. 1 is a schematic illustration of an embodiment of the invention.

DETAILED DESCRIPTION

FIG. 1 is a schematic representation of an embodiment of a system 1 for active sound design. The system 1 is part of an electrically or partially electrically powered vehicle. For active sound design, sounds emitted by one or more loudspeakers 5 are modified depending on the driver type and/or depending on the current driving style. The sounds are, in particular, an engine noise of an internal combustion engine.

For this purpose, the system has sensors for recording measurement parameters 2. These measurement parameters 2 allow a classification of a current driving style and/or driver type of a driver of the vehicle. The measurement parameters 2 form input parameters of a classification device 3 that is configured to determine the current driving style and/or the driver type of the driver of the vehicle on the basis of the measurement parameters 2 recorded by the sensors. The classification of the current driving style or the driver type, in turn, forms an input parameter for a sound control system 4. The sound control system 4 is configured to change the sounds emitted by the loudspeakers 5 based on the classification by the classification device 3, for example, to adapt the volume and/or the timbre and/or the tonality, to create the sound environment in the vehicle interior that corresponds to the driving style or driver type. In the embodiment shown in FIG. 1, the sound control system 4 takes additional parameters 6 into account in the active sound design, for example traffic messages and/or warning messages received via the radio and/or the internet, for example. Thus it makes sense, for example, to encourage the driver of the motor vehicle to refrain from driving in a sporty style by changing the sounds in the vehicle interior, for example when the driver of the motor vehicle is moving towards a traffic jam or an accident. In addition to these parameters 6, the embodiment according to FIG. 1 provides that the output signals of an engine control system 7 also form input signals to the sound control system 4.

| List of reference signs | |
|---|---|
| 1 | system |
| 2 | measurement parameter |
| 3 | classification device |
| 4 | sound control system |
| 5 | loudspeaker |
| 6 | parameter |
| 7 | engine control system |

What is claimed is:

1. An electrically or partially electrically driven vehicle having a system (1) for active sound design, comprising:
   one or more loudspeakers (5);
   at least one sensor for recording measurement parameters (2) relating to a current driving style and/or a driver type of a driver of the vehicle;

a classification device (3) configured to determine the current driving style and/or the driver type of the driver of the vehicle using the measurement parameters (2) recorded by the at least one sensor; and a sound control system for controlling and modifying sounds emitted by the one or more loudspeakers (5) based on the current driving style and/or the driver type classified by the classification device (3), wherein the classification device (3) is configured to determine the current driving style and driver type of the driver of the vehicle on the basis of the measurement parameters recorded by the at least one sensor over a specified time interval, and a time interval for determining the driver type is greater than a time interval for determining the current driving style.

2. The vehicle of claim 1, wherein the at least one sensor records measurement parameters (2) that relate to one or more components of the vehicle that are handled directly by the driver of the vehicle when driving the vehicle.

3. The vehicle of claim 2, wherein the component is a steering wheel, an accelerator pedal, a brake pedal, a clutch pedal, or a gear change device.

4. The vehicle of claim 1, wherein the at least one sensor records biometric data and/or vital signs of the driver of the vehicle.

5. The vehicle of claim 1, wherein the system (1) is configured to modify the sounds emitted by the one or more loudspeakers depending on the current driving style, the classification device (3) is configured to determine the current driving style of the driver of the vehicle using the measurement parameters (2) recorded by the at least one sensor over a specified time interval of from 1 second to 60 seconds.

6. The vehicle of claim 1, wherein the sensor or sensors record at least one measurement parameter selected from the group consisting of: a rotational speed of a steering wheel, an angular acceleration of the steering wheel, an angular velocity of an acceleration pedal, an angular acceleration of the acceleration pedal, a lateral acceleration of the vehicle, a longitudinal acceleration of the vehicle, a speed of an electric motor, a state of a traction control, a state of an electronic stability control or a driving dynamics control.

7. The vehicle as claimed of claim 1, wherein the system (1) is configured to modify the sounds emitted by the one or more loudspeakers (5) depending on the current driving style when the measurement parameters recorded by the sensor or sensors exceed a specific value over a specified period of time.

8. The vehicle of claim 1, wherein the sound control system (4) is configured to take into account other parameters (6) independent of the current driving style and/or the driver type in addition to the classification of the current driving style and/or the driver type, wherein the other parameters (6) are selected from the group consisting of: a current traffic situation, a future traffic situation, a charge state of a traction battery of the vehicle, an operating mode of the vehicle, a reason for a journey being taken by the vehicle when the system for active sound design is operating, vital signs of the driver of the vehicle, output signals of an engine control system (7).

9. The vehicle of claim 1, wherein the vehicle has an AI unit, wherein the classification of the current driving style and/or the driver type on the basis of the measurement parameters and/or the adaptation of the sounds emitted by the one or more loudspeakers is carried out by the AI unit.

10. The vehicle of claim 1, wherein the sound control system changes the sounds emitted by the one or more loudspeakers more quickly when a current driving style is changed to the driver type than when the current driving style is changed from the driver type.

* * * * *